W. H. & JOHN G. PARRISH.

Improvement in Wheel Plows.

No. 123,194. Patented Jan. 30, 1872.

Witnesses
Villette Anderson
F. B. Curtis

Inventor.
W. H. Parrish
Jno. G. Parrish
Chipman Hosmer & Co.
Attys.

123,194

UNITED STATES PATENT OFFICE.

WILLIAM H. PARRISH AND JOHN G. PARISH, OF PORTLAND, OREGON.

IMPROVEMENT IN WHEEL-PLOWS.

Specification forming part of Letters Patent No. 123,194, dated January 30, 1872.

*To all whom it may concern:*

Be it known that we, WM. H. PARRISH and JNO. G. PARISH, of Portland, in the State of Oregon, have invented a new and valuable Improvement in Sulky-Plows; and we do hereby declare that the following is a full, clear, and exact description of the construction and operation of the same, reference being had to the annexed drawing making a part of this specification, and to the letters and figures of reference marked thereon.

Figure 1:
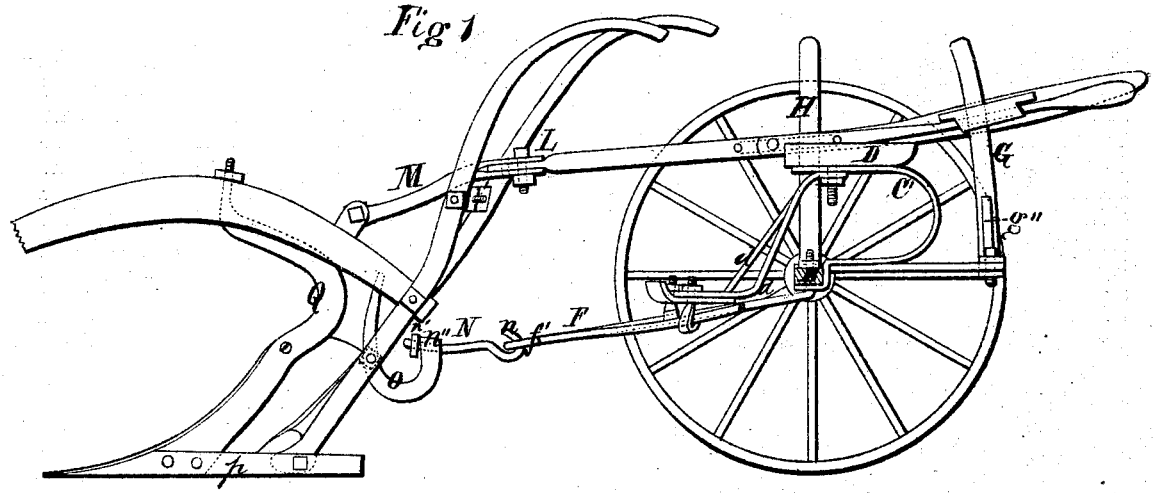
Figure 2:
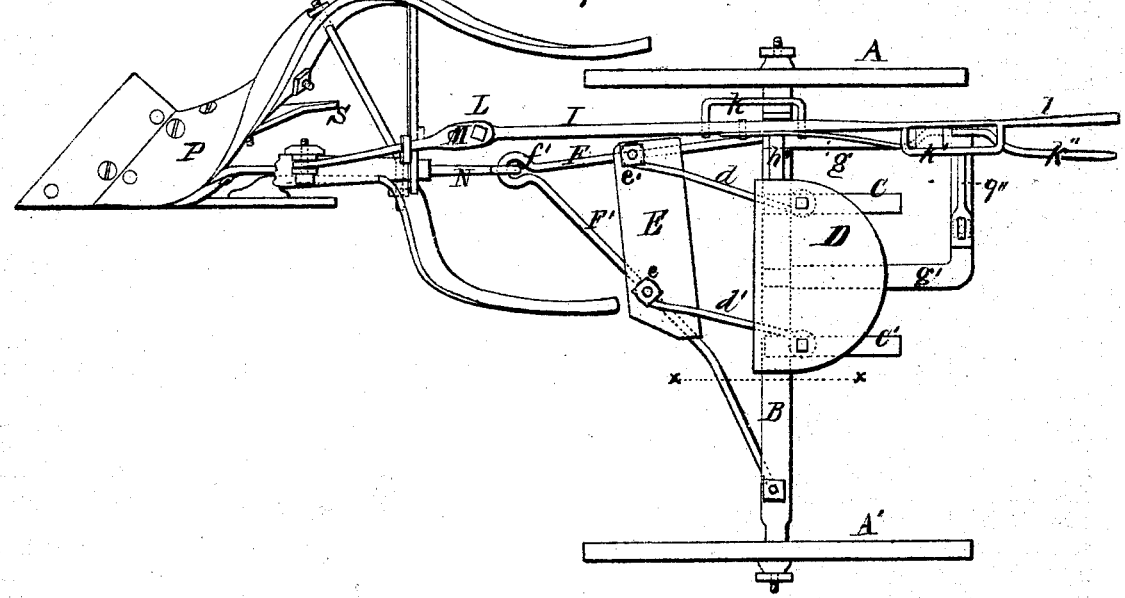

Figure 1 of the drawing is a representation of a vertical longitudinal section through the line $x$ $x$ of our invention. Fig. 2 is a top view of the same.

This invention has relation to sulky-plows; and it consists in the peculiar construction and arrangement of the parts of the plow, of the parts of the sulky, and the connections of the plow and the sulky; the object being the production of a sulky-plow that can be readily controlled by the operator, and that is effectual in operation.

A and A' represent the wheels, and B the axle-tree of the sulky, constructed in the general form shown. To the axle-tree the seat springs C and C', curved as represented, are attached by means of bolts and nuts. On the upper end of the springs the seat D is fixed. Braces $d$ and $d'$ extend downward from the under side of the seat, in the form and manner shown, and serve as additional supports for the seat, and as supports for the foot-rest E. The seat springs and supports are held together by means of bolts and nuts, and the foot-rest and braces are held together also by bolts and nuts, the heads of the bolts $e$ and $e'$ being extended downward, and bent up so as to embrace the draft-arms or hounds F and F', which are connected to the axle-tree, near the wheels, by bolts and nuts, and are drawn together and to one side, and are bent in front so as to form a connecting loop, $f'$, for attachment to the plow, all as shown. Attached to the axle-tree, and extending backward from it, is the support $g$ $g'$, from which projects upward the lever-ratchet G, further supported by a brace, $g''$. The guide-post H projects upward from the axle-tree near the wheel, and is supported by a small brace, $h''$. The lever I is held against and between the ratchet G and the post H by guards $k$ and $k'$, and has riveted to it a spring, $k''$, formed with a bend and a handle, so as to be easily engaged or disengaged with the ratchet G. The lever is connected at L by means of a tongue and an adjustable pivot between and to the jaws of a connecting arm, M, which passes through a guide on the cross-piece of the plow-handles, and is pivoted between ears projecting from the plow-beam. By means of this lever the operator can elevate or depress the point of the plow without interfering with its lateral movement. The draft-arms F and F' of the sulky are connected to the plow by means of a link, N, having a hook, $n$, at one end to connect with the loop $f'$, and a bolt and nut, $n'$, at the other to connect with the head $n''$ of the bent arm O, so as to act like a swivel or otherwise, and at the same time to allow the plow and sulky to be easily disconnected. The bent arm O is of a curved form, is bolted to the inner side of the plow-handle, and connected to the under side of the plow-beam, all as shown, which affords convenience, protection, and strength. The plow is constructed in the general form shown. The mold-board P is made so as to present a curved surface in all of its parts; and to the under side of it is fastened a runner and land-side, $p$, which serves as a support to the plow, and to prevent the earth from falling back into the furrow. The upright and brace Q is curved backward so as to prevent clogging, which is an important feature.

The wheel on the land-side should be smaller than the other, so that the sulky may run in a level manner.

The plow when connected to the sulky will be about in front of the wheel opposite to the land-side, and consequently the handles are bent inwardly so as to be in front of the operator.

S represents a plate or heel, secured to the mold-board P, and intended as a support to keep the plow upright, and assist it in turning.

We claim as our invention—

1. In a sulky-plow, we claim the combination and arrangement of the link M, pivoted to the hind part of the plow-beam, the lever I, pivoted to the link M, the spring $k''$, the post H, and the ratchet bar G, as and for the purpose specified.

2. In combination with the mold-board of a sulky-plow, we claim the additional plate or heel S, constructed and arranged as described, to assist in supporting the plow and in allowing it to be turned around.

In testimony that we claim the above we have hereunto subscribed our names in the presence of two witnesses.

WILLIAM H. PARRISH.
    JOHN G. PARISH.

Witnesses:
 JOHN CAREY,
 CHARLES WHITE.